United States Patent
Poynter et al.

(10) Patent No.: US 11,823,344 B2
(45) Date of Patent: Nov. 21, 2023

(54) MOBILE DEVICE TRACKING MODULE WITHIN A VR SIMULATION

(71) Applicant: MSG Entertainment Group, LLC, New York, NY (US)

(72) Inventors: Benjamin Poynter, New York, NY (US); David E. Rodriguez, Harrison, NJ (US)

(73) Assignee: MSG Entertainment Group, LLC, New York, NY (US)

( * ) Notice: Subject to any disclaimer, the term of this patent is extended or adjusted under 35 U.S.C. 154(b) by 0 days.

(21) Appl. No.: 17/314,252

(22) Filed: May 7, 2021

(65) Prior Publication Data

US 2022/0358736 A1 Nov. 10, 2022

(51) Int. Cl.
*G06T 19/20* (2011.01)
*G06T 7/73* (2017.01)
*G06T 7/246* (2017.01)

(52) U.S. Cl.
CPC .............. *G06T 19/20* (2013.01); *G06T 7/246* (2017.01); *G06T 7/73* (2017.01); *G06T 2207/10016* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 9,449,433 B2* | 9/2016 | Fong | G06F 3/0317 |
| 10,210,382 B2* | 2/2019 | Shotton | G06F 3/017 |
| 11,086,392 B1 | 8/2021 | Sztuk et al. | |
| 2015/0348322 A1* | 12/2015 | Ligameri | G02B 27/017 |
| | | | 345/633 |
| 2018/0150387 A1* | 5/2018 | Kogan | G06F 8/38 |
| 2019/0196940 A1* | 6/2019 | Psiaki | G06F 3/011 |
| 2019/0333288 A1* | 10/2019 | Smet | G06T 19/006 |
| 2019/0361797 A1* | 11/2019 | Yerli | G06F 11/3672 |
| 2021/0311844 A1* | 10/2021 | Daniali | H04N 13/332 |
| 2022/0133212 A1* | 5/2022 | Krueger | A61B 5/4863 |
| | | | 600/301 |

(Continued)

OTHER PUBLICATIONS

Zhang, Li, et al. "Is this my phone? operating a physical smartphone in virtual reality." SIGGRAPH Asia 2020 XR. 2020. 1-2. (Year: 2020).*

(Continued)

*Primary Examiner* — Ryan M Gray

(74) *Attorney, Agent, or Firm* — Sterne, Kessler, Goldstein & Fox P.L.L.C.

(57) ABSTRACT

Disclosed herein are system, method, and computer program product embodiments for mobile device tracking system within a VR simulation. The method includes determining a position and orientation of a mobile device tracking module (e.g., case) attached to a mobile device, calculating a position and orientation of the of the mobile device based at least partially on a position and orientation of a tracking module, simulating a real world environment, generating a virtual visualization of the mobile device and rendering a VR simulation based at least partially on the position and orientation of the display screen of the mobile device. The position and orientation of the display screen provides a virtual position and orientation of the display screen relative to a virtual origin within the VR simulation.

19 Claims, 12 Drawing Sheets

(56) References Cited

U.S. PATENT DOCUMENTS

2022/0295223 A1\* 9/2022 Palos .................. H04W 4/026
2022/0358027 A1 11/2022 Poynter et al.

OTHER PUBLICATIONS

CooleoBrad, "How to Use Your Phone or Tablet in VR! | iOS and Android," accessed at https://www.youtube.com/watch?v=QhfZjbVUxZE, YouTube video published on Dec. 20, 2017; 4 minutes (submitted on accompanying CD-ROM).

Tyriel Wood—VR Tech, "How to Bring Your Phone in VR," accessed at https://www.youtube.com/watch?v=hvzgeQaZgBM, YouTube video published on Sep. 1, 2020; 11 minutes 26 seconds (submitted on accompanying CD-ROM).

Purzel, Franziska, et al. "Applications of a Modular Interaction Framework for Virtual Reality Testing in a Smart Environment." Procedia CIRP 9 (2013): 35-39. (Year: 2013).

Amano, Tatsuya, et al. "Smartphone applications testbed using virtual reality." Proceedings of the 15th EAI International Conference on Mobile and Ubiquitous Systems: Computing, Networking and Services. 2018. (Year: 2018).

\* cited by examiner

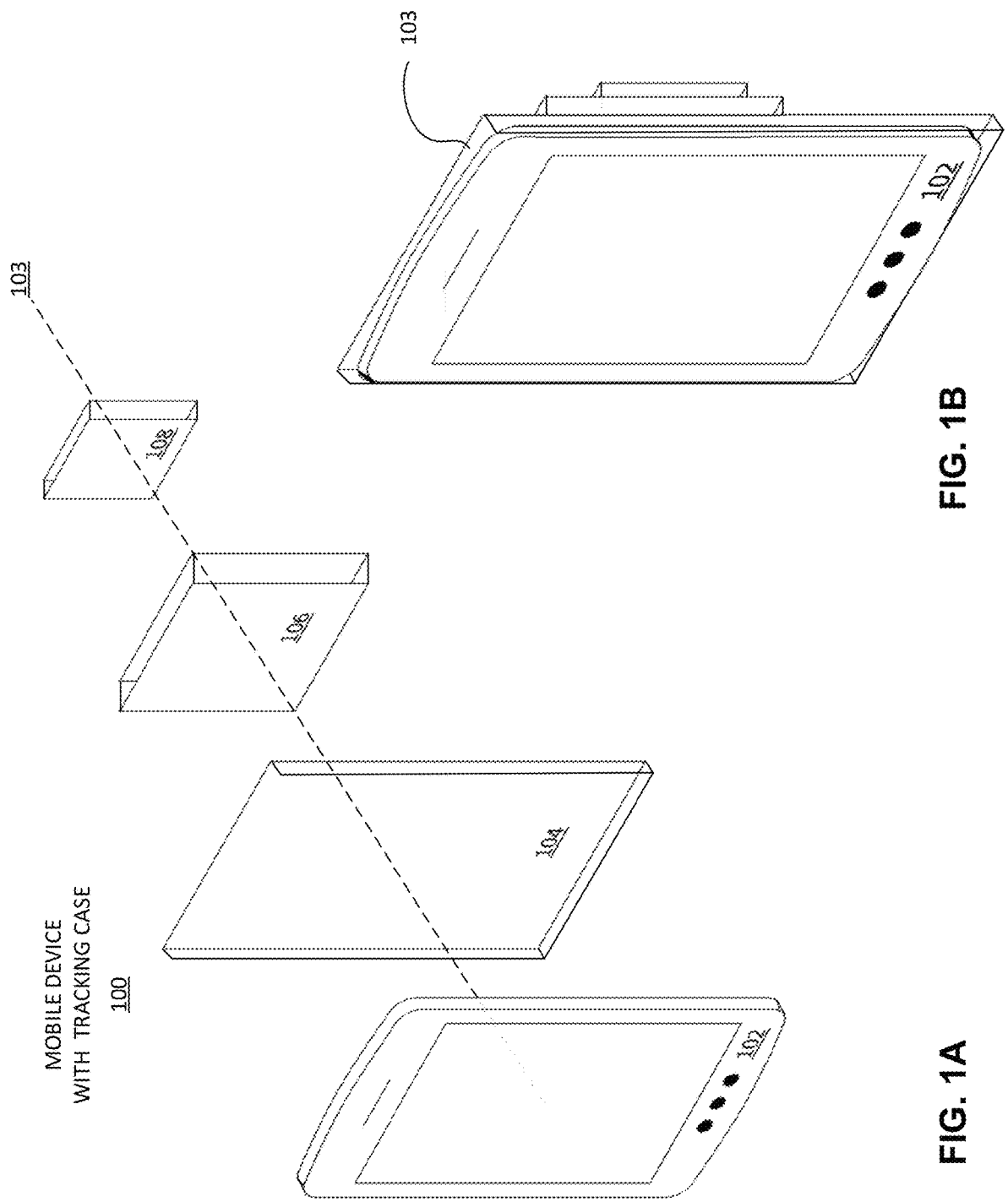

MOBILE DEVICE TRACKING MODULE WITHIN A VR SIMULATION

CROSS-REFERENCE TO RELATED APPLICATIONS AND INCORPORATION BY REFERENCE

This application incorporates, by reference, U.S. application Ser. No. 17/314,193, filed May 7, 2021, entitled "Tool For Mobile App Development And Testing Using A Physical Mobile Device," in its entirety. U.S. application Ser. No. 17/314,193, describes an environment for mobile app development and testing through mobile device visualization within a Virtual Reality (VR) simulation environment.

BACKGROUND OF THE DISCLOSURE

When developing, designing, or conceiving real-world environment-based mobile applications (apps), it may be cumbersome and inefficient for a developer to visit a real-world environment each time they would like to test their mobile app (application) accurately within that environment. Also, it may be difficult to visualize and play prototypes of the app without physically being at the real-world environment.

For example, if a developer is creating a mobile game that interacts with a large amusement park ride, it may be difficult to test the game efficiently with enough iterations (tests). The developer would have to travel to the real-world amusement park/venue to test every new build of their game. This travel may be a challenge, especially when developers are working from remote locations.

BRIEF DESCRIPTION OF THE DRAWINGS/FIGURES

The accompanying drawings, which are included to provide a further understanding of the disclosure and are incorporated in and constitute a part of this specification, illustrate exemplary embodiments.

FIG. 1A illustrates an exploded block diagram of a mobile device with tracking module, according to some embodiments.

FIG. 1B illustrates a fully assembled tracking module, according to some embodiments.

The present disclosure will now be described with reference to the accompanying drawings. In the drawings, like reference numbers may indicate identical or functionally similar elements.

DETAILED DESCRIPTION OF THE DISCLOSURE

Figure 1C:
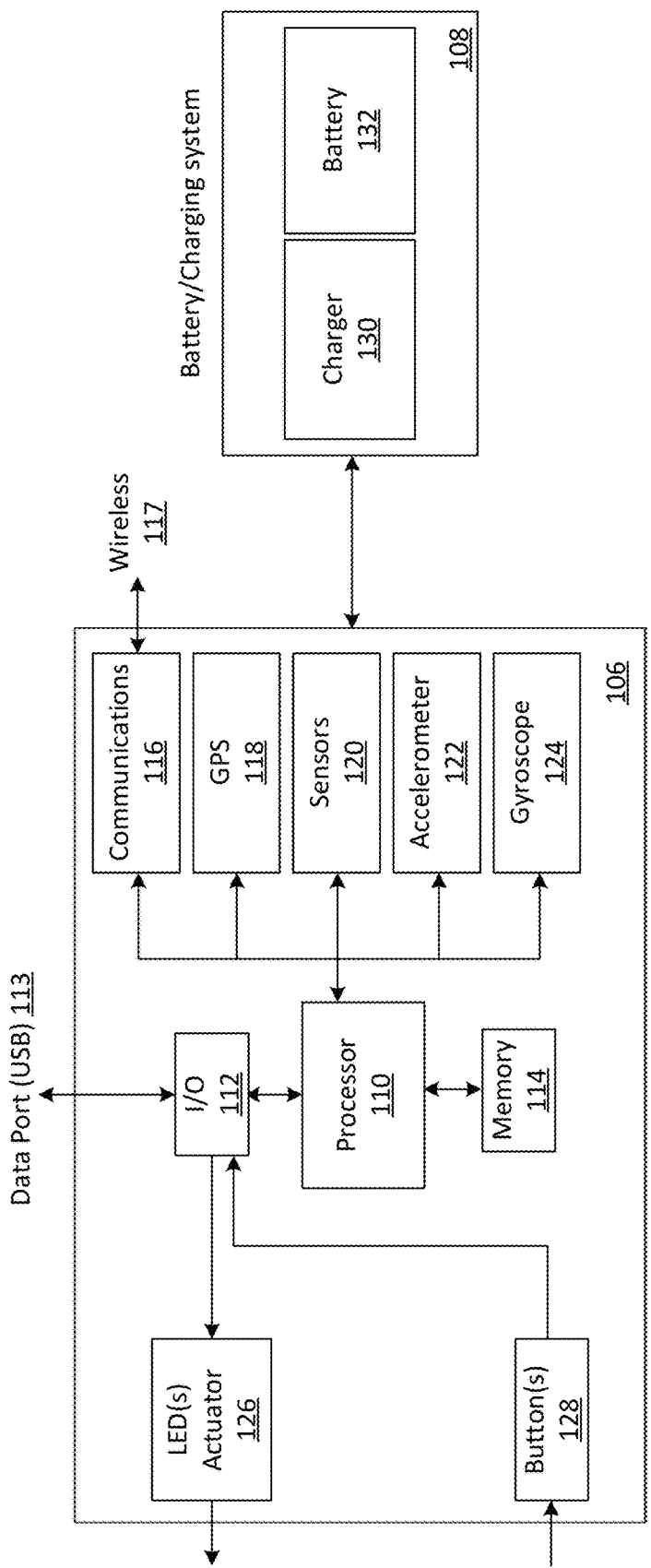
FIG. 1C illustrates a partial system diagram of an active tracking module, according to some embodiments.

Provided herein are system, apparatus, device, method and/or computer program product embodiments, and/or combinations and sub-combinations thereof, for a mobile device tracking system within a VR simulation.

The detailed description to follow is to describe various embodiments providing an environment to test a mobile application (app) that may be, for example, currently in development. A conventional test environment may include a personal computer (PC) with application coding software, game engine, testing libraries, compilers, renderers, etc. However, a unique challenge exists for the conventional testing of mobile apps that function by interacting with a real-world environment. Conventionally, these mobile apps require a tester to travel to the real-world environment to properly test any elements that directly interact with that location.

The detailed description to follow is directed to a tracking system to track a position (location) and orientation of a physical mobile device operational within a virtual real-world test environment. The location and orientation of the physical mobile device may be input to a VR simulation testing system to simulate a position (location) and orientation of a virtual rendering of the mobile device within a VR simulation. As a tester moves the physical mobile device around during testing, its corresponding virtual rendering will move accordingly in the VR simulation.

In some embodiments, during testing, the tester holds a mobile device (e.g., smartphone) in their hands while wearing a VR headset (VR device). The simulation of the real-world environment is fed as imagery to the VR headset. A wearer of the VR headset would be able to look around the real-world environment as if they were there in person. The simulated VR environment may exist in different forms such as, LIDAR scanned environments, sculpted 3D environments in a game engine, or separate software which enables a VR connection.

In some embodiments, a mobile device tracking module may be operative with the physical mobile device and configured with active tracking mechanisms (e.g., GPS, gyroscope, accelerometer, magnetometer, inclinometer, etc.) allow for precise tracking relative to a VR device. In another embodiment, lights on an exterior of the tracking module (e.g., LEDs) allow for precise tracking relative to a VR device with cameras.

In some embodiments, a mobile device tracking module may be operative with the physical mobile device and is configured with passive tracking mechanisms (e.g., markings, colors, patterns, etc.) and is tracked with cameras to allow for precise tracking relative to a VR device.

In some embodiments, the cameras are onboard the VR device (Inside-Out tracking) or are external to the VR device (Outside-In tracking).

In one example, a venue represents a real-world environment for hosting an event. The venue may represent a music venue, such as a music theater, a music club, and/or a concert hall, a sporting venue, such as an arena, a convention center, and/or a stadium, and/or any other suitable venue. The event may represent a musical event, a theatrical event, a sporting event, a motion picture, and/or any other suitable event that may present interactive content to members of an audience within the venue.

Conventionally, while developing an audience interactive app for an audience member's smartphone, a developer would compile a latest version of their app and download it to their smartphone. The developer, or a tester, would then conventionally travel to the venue to test the latest version of their app, for example, recent upgrades or new features. However, travel is expensive, time consuming and not always useful, as the venue may not be fully operational (e.g., under construction).

In the various embodiments, a simulation of the real-world environment may be used in the test environment as a substitute for the tester being on-location, namely, physically present at the real-world environment. In these embodiments, imagery from the real-world environment may be collected by video, pictures, LIDAR scans, camera arrays, pre-recorded imagery, etc. This imagery is then used to generate a simulation of the real-world environment that may then be rendered on a stand-alone computer or on a virtual reality (VR) headset.

If one were actually at the venue playing an interactive app on their mobile device (smartphone), they would also see the smartphone itself and their hands/fingers as they interacted with the smartphone. Therefore, in various embodiments, a visualization of the smartphone is simulated and overlaid on the simulation of the real-world environment (venue). Hands and finger movements may also be simulated and overlaid on the simulation of the real-world environment (venue).

Also, if one were actually at the venue playing an interactive app on their mobile device (smartphone), they would also see the smartphone move relative to the venue as they moved the smartphone in different directions or pointed it at a specific item of interest in the venue. Therefore, in various embodiments, a position and orientation of the smartphone relative to the VR headset is determined and then simulated as a virtual point of origin within the simulation of the real-world environment (venue).

In addition, if one were actually at the venue playing an interactive app on their mobile device (smartphone), they would also physically interact with the smartphone (e.g., touch, vibration, audio, video, etc.). Therefore, in various embodiments, physical interactions the tester has with the smartphone they are holding are recorded and simulated on the visualization of the smartphone in the VR headset. Mobile app signals directed to the phone (e.g., audio, video, and vibrations) may also be simulated and communicated to the smartphone, such that the tester actually feels, for example, haptic feedback. Sending these signals to the smartphone gives the tester a "real-world" feel as they would if they were physically using the app at the venue.

In various embodiments described herein, the technology described herein may allow a developer to cut down on iteration and travel time when developing, debugging, and/or testing their mobile applications (apps) at real-world environments, like location-based entertainment (LBE) venues including indoor or outdoor installations, within a Virtual Reality (VR) environment. By combining physical and/or simulated data from a physical and virtual mobile device and rendering the physical and/or the simulated data within a VR simulation, the various embodiments described herein may provide the developer with a hands-on accurate representation and feel for how their mobile app will work at a real-world environment. For example, the developer may test their location based mobile apps, for example, dual screen mobile apps, mobile games, and mobile augmented/mixed reality apps to provide some examples, using a physical mobile device within a VR simulation.

The technology described herein in various embodiments may run in real-time, or near-real time, and may include a mobile device tracking module, such as a tracking case, that attaches to a physical mobile device in the real world to allow for precise inside-out or outside-in tracking of its physical location coordinates and screen boundary coordinates relative to a virtual origin within a VR simulation.

In some embodiments, the system combines simulated and physical input, camera, microphone, sensor, display, and audio data between a VR simulation, a remote app running on a physical mobile device, and a mobile app simulation running and being developed on a mobile app development PC. In some embodiments, the system transmits and combines simulated and physical input, camera, microphone, sensor, display, and audio data between a VR simulation and a mobile app running on a physical mobile device without the use of a mobile app development PC.

In some embodiments, a virtual mobile device visualization within the VR simulation combines physical and simulated inputs, such as, but not limited to, camera, microphone, sensor, display, and audio data from the VR simulation. The remote app or mobile app runs on a physical mobile device or optionally a mobile app simulation running and currently being developed on a mobile app development PC.

In some embodiments, the system uses tracked mobile device case screen boundary coordinates to provide a video pass-through visualization of a physical mobile device screen by cropping a video feed from the VR headset based on calculated screen boundary coordinates. For example, markers or identifiers, which can be on the corners of the tracked mobile device, allow the cropping of the video feed based on identifying their position and orientation.

These various embodiments, which are described in further detail below, represent one or more electronic software tools, that when executed by one or more computing devices, processors, controllers, or other devices that will be apparent to those skilled in the relevant art(s) without departing from the spirit and scope of the present disclosure, may analyze, process, and/or translate audio, video and movement and/or their corresponding digital commands.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

FIG. 1A illustrates an exploded block diagram of a mobile device with a mobile device tracking module 103 (tracking module), according to some embodiments. System 100 may include mobile device 102 (e.g., smartphone, tablet, wearable computer, etc.) representing a real-world input/output system that may interact in a virtual reality (VR) or augmented reality (AR) environment.

In various embodiments, mobile device tracking module 103, is configured in an active tracking embodiment as an interface 104 (e.g., case/mobile device holder), with an electronic components module 106 and power components module 108. While shown as three sections, tracking module 103 can be a single module or any number of modules and vary in size without departing in scope from the technology described herein.

Tracking module 103 is attached to mobile device 102 to track a position (location) and orientation (e.g., location in six degrees of movement) of the mobile device 102 relative to a proximate (e.g., arm's length) Virtual Reality (VR) headset 308 (See FIGS. 3-8), as will be discussed in greater detail hereafter. The position and orientation of the physical mobile device may be input to a VR simulation testing system to simulate a position and orientation of a virtual rendering of the mobile device within a VR simulation. As a tester moves the physical mobile device around during testing, its corresponding virtual rendering will move accordingly in the VR simulation.

A tracking module's position and orientation, relative to the VR headset, provides physical location coordinates and screen boundary coordinates relative to a virtual origin within a VR simulation. For example, if a mobile device's position and orientation are known, then the system can calculate the mobile device boundary coordinates as well as screen perimeter coordinates based on known mobile device dimensions (e.g., model and model specs). The model and dimensional information can be stored locally in memory of any of: the mobile device, the tracking module, the VR device, the virtual simulation system, the mobile application development system or remotely in server storage, such as, cloud based storage systems.

In one embodiment, mobile device tracking module 103 includes an interfacing member 104 (e.g., case) to secure to the mobile device 102. For example, the interfacing member may comprise a back half of a custom phone case conventionally used for a specific phone model or form factor. However, any interfacing member that securely attaches to the mobile device can be substituted without departing from the scope of the technology described herein.

In addition, one or more sections 106 and 108 are integrated with or separately attached with interfacing member 104. As will be discussed in greater detail in association with FIG. 1C, electronic components module 106 may include one or more active sensors, a computer processor, communication circuitry and/or interfaces, position or orientation sensors. Power components module 108 may include known power sources and charging mechanisms (e.g., batteries and charger or a power connection to the mobile device or other external power source).

FIG. 1A illustrates a mobile device 102 with mobile device tracking module 103 attached thereto, according to some embodiments. As shown, a mobile device tracking module 103 attaches securely to a mobile device (e.g., smartphone).

While shown as a similar size and shape as the mobile device, the mobile device tracking module may be of any shape, size, design, or material (e.g., 3D printed from liquid plastics). In some embodiments, the tracking module is integrated within the mobile device itself (i.e., using components of the mobile device for active tracking).

FIG. 1C illustrates a system diagram of an active tracking module, according to some embodiments.

In some embodiments, electronic components module 106 may include a computer processor 110 (e.g., a microprocessor) with associated computer memory 114 and configured to track a position (location) and orientation of the attached mobile device 102. In addition, the computer processor may process data inputs/outputs through interfaces 112 and process position and orientation data captured by known location and orientation devices 118-124. Location and orientation devices include, but are not limited to, global positioning system (GPS) 118, active sensors 120 (e.g., LIDAR (distance), optical sensors (object detection), inclinometer (tilt), etc.), accelerometer 122 (force caused by vibration or a change in motion (e.g., acceleration)) and gyroscope 124 (orientation and angular velocity). Inputs from buttons 128 provide control (on/off, synchronization, wireless connectivity, etc.). LED actuator 126 provides electrical signals to one or more LEDs that may be arranged on an outside of the tracking module. In addition to various known status lights (e.g., on/off), the actuators may light up LEDs strategically arranged (e.g., four corners of a front side) on the tracking module to be actively tracked by cameras as will be discussed in greater detail in FIG. 2B.

Power components module 108 may include known power sources and charging mechanisms (e.g., battery 132 and charger 130 or a power connection to the mobile device). While shown as two modules, the number, size and shape of these modules can vary without departing from the scope of the technology described herein.

In the active mobile device tracking module, communication circuitry 116 may send position and orientation data to the VR simulator (e.g., the VR headset), a standalone VR simulation system, a mobile app development system or the mobile device 102. For example, the tracking module would actively be recognized by the VR device (e.g., helmet) by communications (e.g., Bluetooth®) including position and orientation data relative to the VR device. The VR device may communicate information to the tracking module, such as presence, activation, synchronization, etc.

Communications may be through wired (e.g., through a data port connection 113 (e.g., USB)) or wireless 117 communication mediums. For example, the communications may be implemented on a cellular network (e.g., a long-term evolution (LTE) network, a code division multiple access (CDMA) network, a 3G network, a 4G network, a 5G network, Bluetooth®, Bluetooth Low Energy (BLE) or another type of known or next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

In some embodiments, the tracking module is operatively coupled with the mobile device 102 (e.g., wirelessly, wired connection through the data port, etc.). The mobile device is configured to implement one or more of the tracking module elements, such as, a tracking application (app) determining position, orientation and/or communication with the VR simulator (e.g., the VR headset), a standalone VR simulation system or a mobile app development system.

In some embodiments, a mobile device tracking module 103 secures to the mobile device and includes elements (active or passive) to track a position and orientation of the mobile device 102. In one embodiment, the mobile device tracking module 103 attaches with a friction fit (tightly coupled), but may include fasteners such as straps, snaps, adhesive strips, wraps, mechanical fasteners such as clips, rotational mechanisms, tilt mechanisms, hinged connectors, separate grips, adjustable tighteners, etc. In some embodiments, the tracking module may utilize a friction fit concept, but be attached through thin bars around the mobile form factor as opposed to a case which fully wraps around the mobile form factor.

In addition, the mobile device tracking module maybe constructed of molded plastic, metal, include flexing or flexible materials, gel, moldable elements, handles, grips, etc.

Figure 2B:
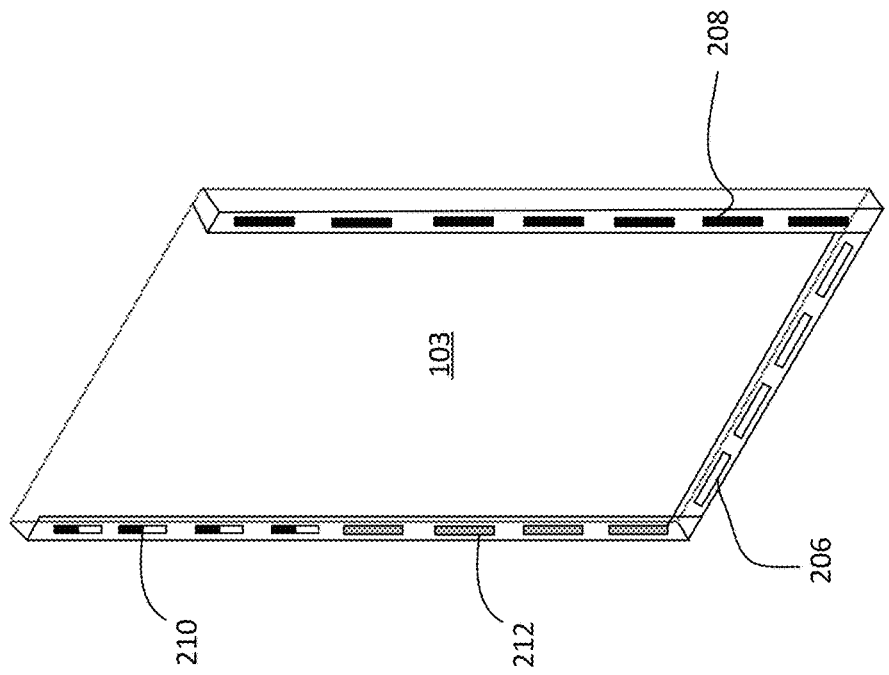
FIG. 2B illustrates a passive mobile device tracking module, according to some embodiments.
Figure 2A:
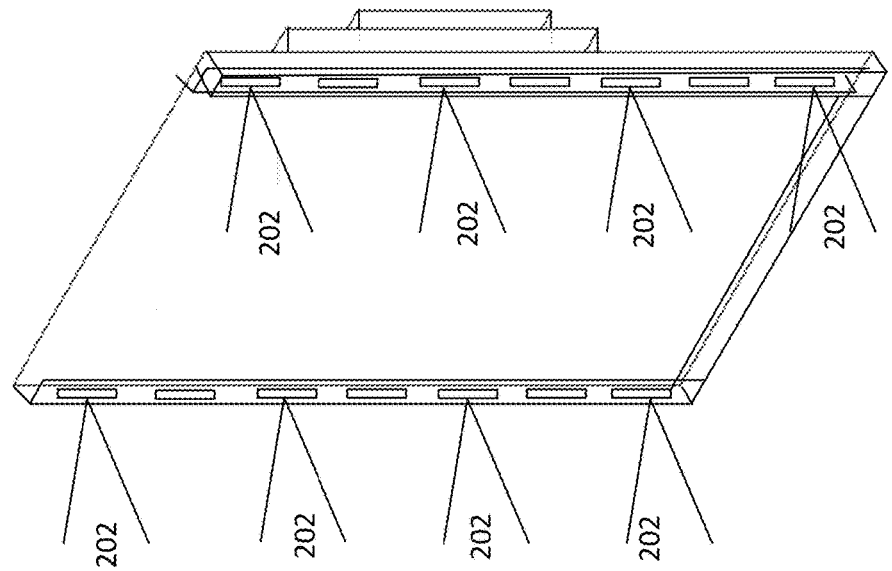
FIG. 2A illustrates an active mobile device tracking module attached thereto, according to some embodiments.

FIG. 2A illustrates an active mobile device tracking module 201 configured with lights, according to some embodiments.

In some embodiments, the mobile device tracking module (e.g., case) includes lights 202 strategically placed on an outside surface of the tracking module. For example, they are arranged around a perimeter of the module, on four corners or in a pattern. Lights 202 may be light emitting diodes (LEDs), liquid crystal displays (LCDs) or equivalents.

Figure 3:
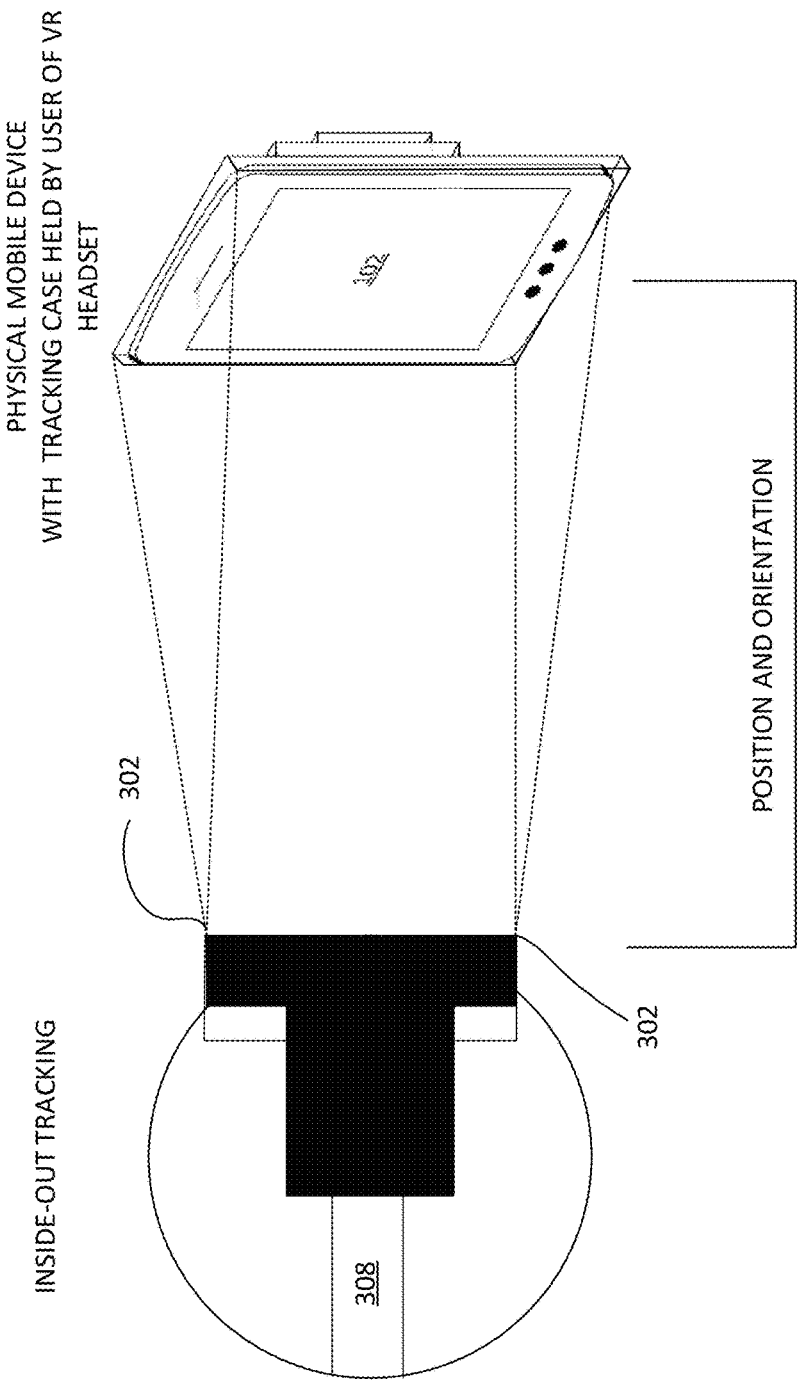
FIG. 3 illustrates an Inside-Out tracking system, according to some embodiments.

In some embodiments, the lights may be tracked by built-in sensors or cameras located onboard a VR headset 308 (FIG. 3, Inside-Out tracking). LED actuator 126 (FIG. 1C) turns on/off LEDs for continuous tracking or for tracking during a selected time period. The lights may be powered by the tracking module power components 108 or by power received from the mobile device. In some embodiments, the lights are flashed for detection purposes.

Figure 4:
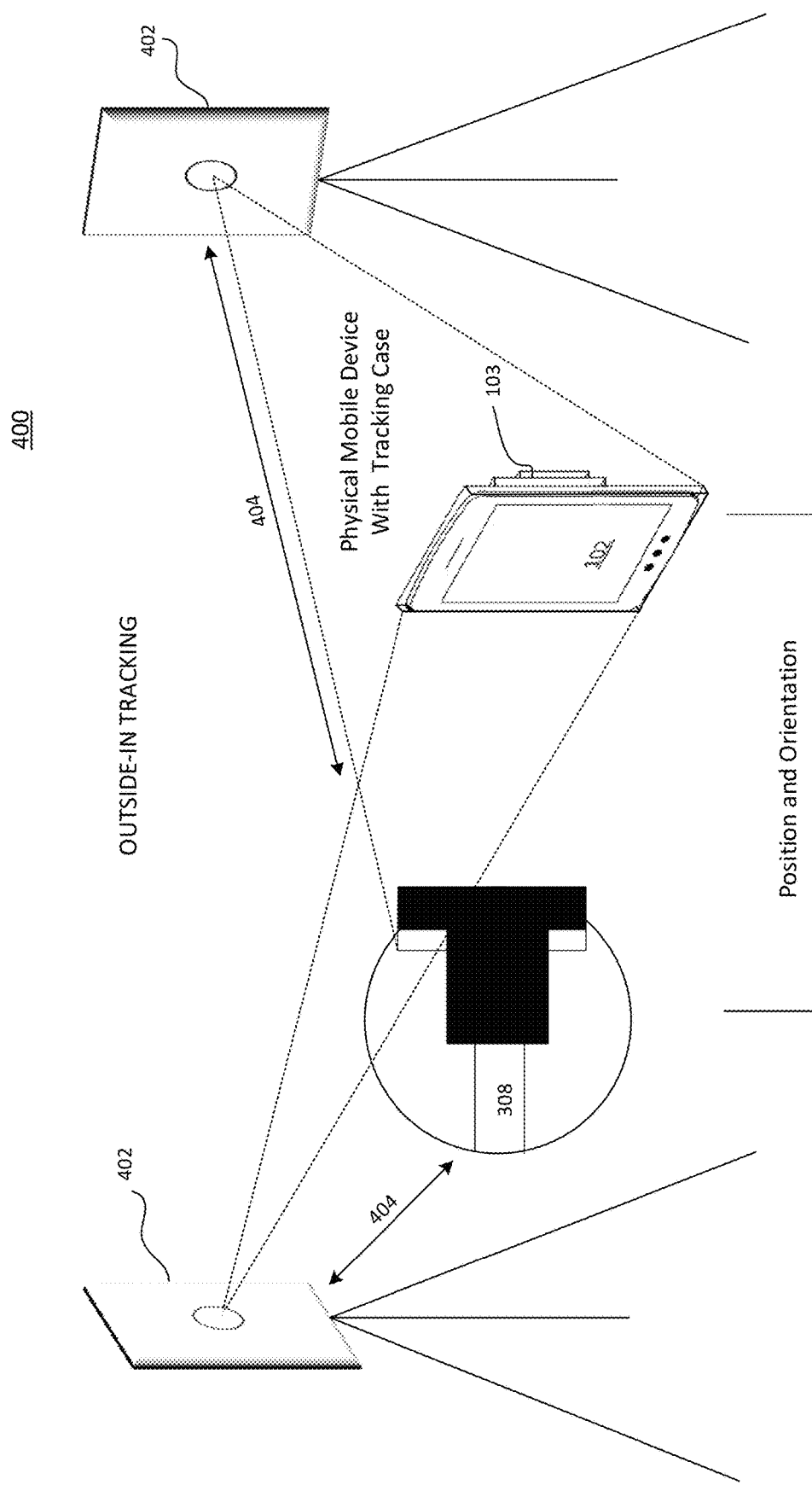
FIG. 4 illustrates an Outside-In tracking system, according to some embodiments.

In some embodiment, the lights are tracked by one or more cameras or sensors separate from the VR headset (FIG. 4, Outside-In tracking).

FIG. 2B illustrates a passive mobile device tracking module 204 configured with markers, according to some embodiments. Passive tracking module, includes a case with passive markers, such as high contrast fiducial markers 206 (e.g., reflective or electroluminescent) and/or 208 (dark) are placed along front edges of the tracking module. These high contrast fiducial markers may include, but are not limited to, printed designs and patterns, bar codes 210, bright colors 212, or types of markings around the edge of the mobile device case so that it is clearly visible in a camera that may be used with machine vision to track those fiducial markers. Known multiple machine vision libraries exist with the capability to track objects based on colors or patterns. The markers may be of a single type or include multiple types (e.g., as shown). In some embodiments, the passive tracking module does not require electrical or power components as shown in FIG. 1C.

The fiducial markers may be located at various positions around the case, and vary in shape, repetition and design. These fiducial markers provide a target for the VR headset 308 to track a position and orientation of the mobile device (e.g., smartphone) in space by triangulating between 3 or more known marker positions on the case and by knowing the dimensions of the phone case. With this information the system may approximate the 3D location and orientation of the mobile device case in space relative to the VR headset camera position. This type of case also may include conventional machine vision configuration and setup steps so that it may be properly calibrated for tracking.

In another embodiment, the fiducial markers are tracked by one or more cameras or sensors separate from the VR headset.

In all embodiments, the mobile device and attached case may operate in portrait or landscape mode without departing from the scope of the technology described herein.

FIG. 3 illustrates an Inside-Out tracking system, as per some embodiments.

Inside-Out tracking system 300 is implemented with onboard cameras or sensors (e.g., optical or infrared) as part of a VR headset. These onboard cameras 302 are used to track objects using machine vision techniques without the use of external base stations or separate external cameras. VR headsets 308 provide basic support for Inside-Out tracking for the headset position. These headsets may track active lights or passive markers on the mobile device tracking module 103 and use machine vision techniques to track the motion of the lights/markers, then since they know the exact position of those markers, they may then calculate the orientation and position of the mobile device tracking module.

Since a location of the mobile device tracking module relative to the physical edges of the mobile device case 103 is known, a pre-determined measured look-up table of relative distances from the edges of each physical mobile device case (e.g., known dimensions of cases to smartphone dimensions including screen size) with respect to the location and orientation of the tracker is created. This provides a calculated location of the mobile device case's bounding rectangle (perimeter) that may be used within the VR Simulation.

For example, once a position and orientation of the mobile device tracking module is known, stored information (in the mobile device tracking module if active or in the VR device if passive) reflecting relative position information of the mobile device tracking module to the mobile device may be used to calculate position and orientation of the mobile device. In one example embodiment, the mobile device tracking module is a tracking case that fits to the form factor of the mobile device, such as a smartphone case. Additional stored information (e.g., in the mobile device tracking module or mobile device, if active tracking or in the VR device, VR simulation system, mobile device app development system, or cloud, if passive) may include a form factor (dimensions) of the mobile device and relative position and dimensions of a perimeter of a display screen on the mobile device.

This similar technique may be used for Inside-Out tracking of a custom-built mobile device case. For example, the custom-built would include fiduciary markers, LED lights, or other forms of identification embedded within the case itself to enable the tracking of the mobile device's position and orientation data.

In some embodiments, Inside-Out tracking is applied to active tracking modules 201, where the active tracking module 201 includes lights 202 (visible or infrared) that surround the mobile device and are powered by the mobile device or batteries. The lights may have various positions around the case. These lights allow the VR headset to track the position of the mobile device 102 in space by triangulating between 3 or more known light positions on the case and by knowing the dimensions of the mobile device case.

With this information the system may approximate the 3D location of the mobile device in space relative to the VR headset camera position.

FIG. 4 illustrates an Outside-In tracking system, as per some embodiments.

In an Outside-In tracking embodiment, the system 400 makes use of one or more external stand-alone cameras 402 located near (e.g., same room) the VR headset 308 to track the mobile device tracking module 103. Camera(s) 402 track(s) the mobile device tracking module's position and orientation relative to the VR headset 308 (both devices are located within the camera's field of view). If two cameras are present, they will each process image data reflecting relative positioning as seen in their respective field of views. This information is fed (e.g., wirelessly 404) to the VR headset 308 so it may recognize position and orientation of the mobile device tracking module within the virtual space of the VR headset 308. As the VR headset and the mobile device tracking module are being tracked in the same calibrated space at once, they can be correlated. Known image processing techniques for recognizing same objects in multiple images (videos) use, for example, tie points, vanishing points, and recognition of common vertices and planes to calculate the relative position and orientation. Other known image processing techniques for processing multiple images of a same object(s) can be substituted without departing from the scope of the technology disclosed herein.

As previously described, since a location of the mobile device tracking module relative to the physical edges of the mobile device module 103 is known, a pre-determined measured look-up table of relative distances from the edges of each physical mobile device case (e.g., known dimensions of cases to smartphone dimensions including screen size) with respect to the location and orientation of the tracker is created. This provides a calculated location of the mobile device case's bounding rectangle (perimeter) that may be used within the VR Simulation.

For example, once a position and orientation of the mobile device tracking module is known, stored information (in the mobile device tracking module if active or in the VR device if passive) reflecting relative position information of the mobile device tracking module to the mobile device may be used to calculate position and orientation of the mobile device. In one example embodiment, the mobile device tracking module is a tracking case that fits to the form factor of the mobile device, such as a smartphone case. Additional stored information (in the mobile device tracking module if active or in the VR device if passive) may include a form factor (dimensions) of the mobile device and relative position and dimensions of a perimeter of a display screen on the mobile device.

Another method of providing the rectangle's bounding box is to track the edges of the fiducial markers within the VR headset captured video feed and combine that with known geometry and dimensions of the mobile device case, through the use of a look up table for each mobile device supported, and calculate a best fit using the known mobile device tracking module 103 geometry and dimensions. This will tell the system which pixels in the VR headset captured video are within the boundaries of the mobile device case, and the system may use this as a mask to poke a window through the VR simulation into the VR headset captured video or it may crop the captured video and overlay it on the VR simulation.

Figure 5:
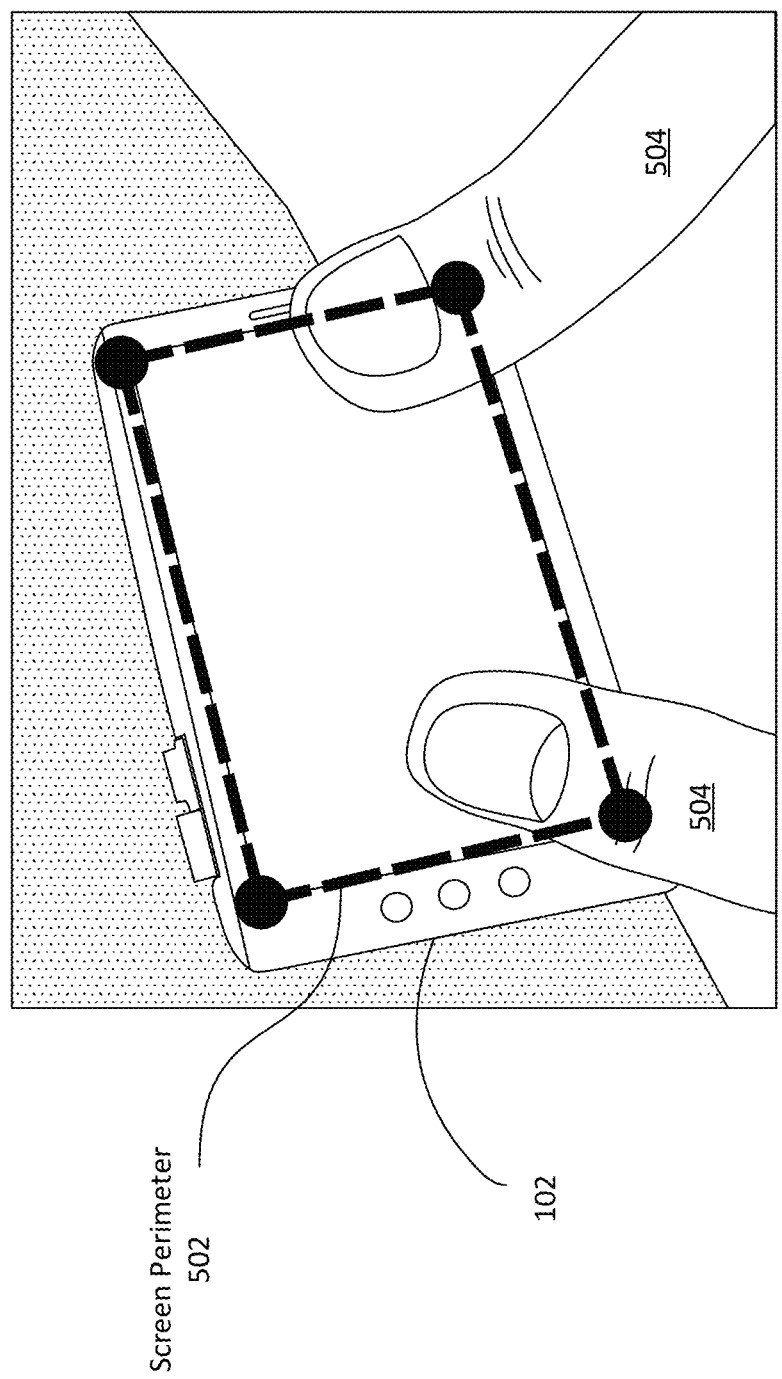
FIG. 5 illustrates visualizing of a mobile device user's hands within VR, according to some embodiments.

FIG. 5 illustrates visualizing mobile device user's hands within VR, according to some embodiments. In one embodiment 500, hardware finger tracking technologies onboard the VR headset may include machine vision or LIDAR/Laser cameras that track finger positions that may then be input as an overlay 504 to the virtual mobile device visualization, so the user is provided a more immersive mobile device experience. These finger tracking methods may be used with both Outside-In and Inside-Out tracking to simulate, for example, real-world touching 504 or handling (e.g., rotating or shaking) of the mobile device 102. In a second embodiment, visualizing the user's hands within VR is performed by inverse kinematic rig (IK Rig) on a 3D model of hands (not shown). For example, hands are represented as bones in a skeleton, and are tracked based on where on the screen (within the screen perimeter 502) they are touching and moving the IK Rig to match those touch poses. In some embodiments, cropped images include see-through imagery of the live hands as generated from the one or more cameras (headset or external).

Figure 6:
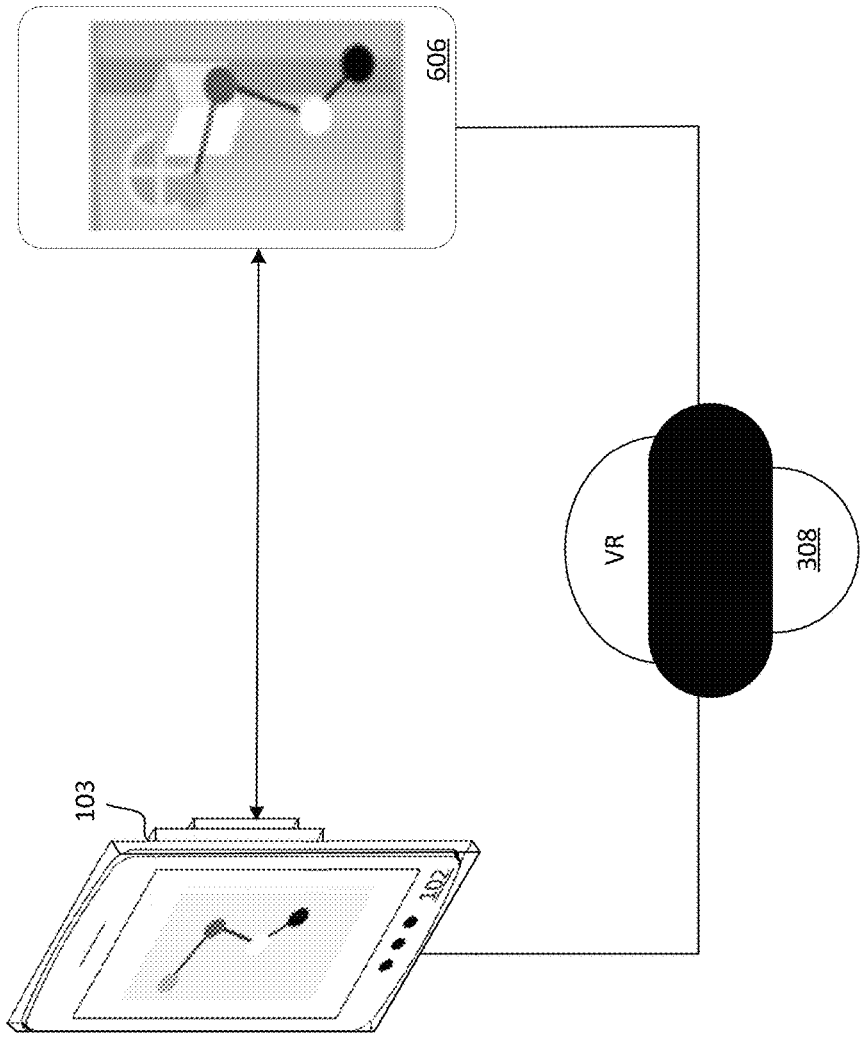
FIG. 6 illustrates a system for a virtual mobile device visualization within a virtual reality (VR) simulation, according to some embodiments.

FIG. 6 illustrates a system for a virtual mobile device visualization within a virtual reality (VR) simulation, according to some embodiments. System 600 includes physical mobile device 102 (e.g., smartphone, tablet, wearable computer, etc.) representing a real-world input/output system that may interact in a virtual reality or augmented reality environment. The physical mobile device 102, in various embodiments, includes a mobile device tracking module 103 to establish a position (e.g., location in six degrees of movement) of the mobile physical device 102 relative to Virtual Reality (VR) headset 308.

VR is a simulated experience that can be similar to the real world. Applications of virtual reality include entertainment (e.g. video games), education (e.g. medical or military training) and business (e.g. virtual meetings). Other distinct types of VR-style technology include augmented reality and mixed reality, sometimes referred to as extended reality or XR.

Currently, standard virtual reality systems use either virtual reality headsets or multi-projected environments to generate realistic images, sounds and other sensations that simulate a user's physical presence in a virtual environment. A person using virtual reality equipment is able to look around the artificial world, move around in it, and interact with virtual features or items. The effect is commonly created by VR headsets consisting of a head-mounted display with a small screen in front of the eyes, but can also be created through specially designed rooms with multiple large screens. Virtual reality typically incorporates auditory and video feedback, but may also allow other types of sensory and force feedback through haptic technology.

When developing a new VR application, especially for large scale environments, travelling to a subject location to test the application as it is being developed may not be convenient or possible. Therefore, in various embodiments described herein, a virtual mobile device visualization within a VR simulation 606 combines physical and simulated inputs, such as, but not limited to, camera, microphone, sensor, display, and audio data from the VR simulation 606. A mobile app under development is installed and executed (computer processor) on the physical mobile device 102. In addition, in one embodiment, the system 600 uses tracked mobile device case screen boundary coordinates to provide a video pass-through visualization of the physical mobile device screen by cropping a video feed from the VR headset 308 based on calculated screen boundary coordinates (i.e., coordinates of perimeter of display screen) of physical mobile device 102.

For example, a test mobile app is installed on the mobile device 102, the mobile device 102 is then held/moved by a wearer of the VR headset 308 during testing. A virtual environment, corresponding to a real-world location where the app will be used on a mobile device after testing is simulated. The real inputs/outputs of the mobile device, as the tester interacts with the mobile device while wearing the VR headset, are combined with simulated mobile device inputs/outputs, a virtualization of the mobile device, and the virtual environment and fed as imagery to the VR headset.

By combining physical and simulated data from a physical and virtual mobile device and rendering that within a VR simulation, the system may provide the developer a hands-on accurate representation and feel for how their mobile app will work at a real-world location. For example, the developer may test their location based mobile apps, dual screen mobile apps, mobile games, and mobile augmented/mixed reality apps using a physical mobile device within a VR simulation.

Figure 7:
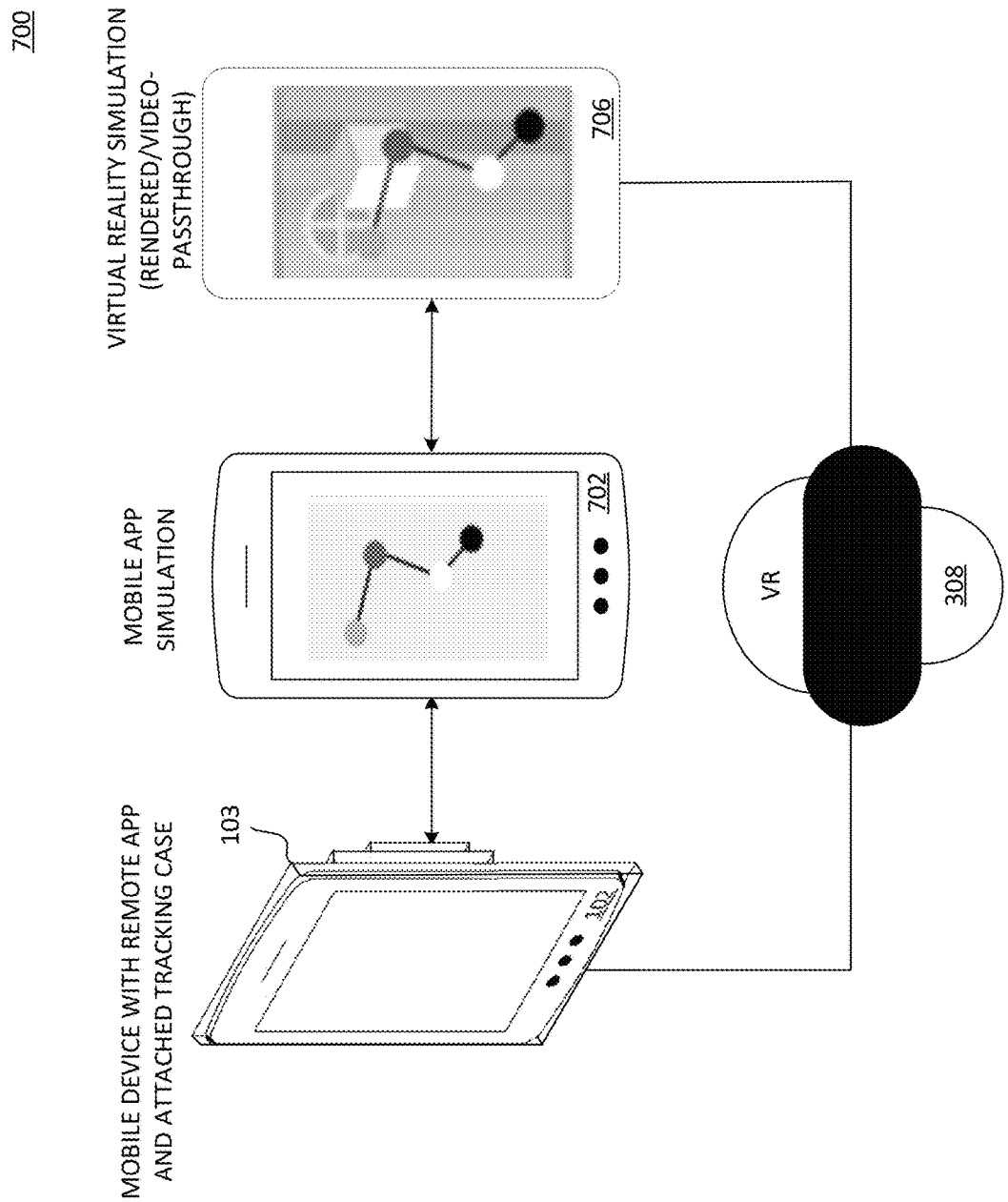
FIG. 7 illustrates a system for a virtual mobile device visualization within a virtual reality (VR) simulation, according to some embodiments.

FIG. 7 illustrates a system 700 for a virtual mobile device visualization within a virtual reality (VR) simulation, according to some embodiments. System 700 for a virtual mobile device visualization within a virtual reality (VR) simulation, according to some embodiments. System 700 includes physical mobile device 102 (e.g., smartphone, tablet, wearable computer, etc.) representing a real-world input/output system that may interact in a virtual reality (VR) or augmented reality (AR) environment. This physical mobile device (mobile device) 102, in various embodiments, includes a mobile device tracking module 103 to establish a position (e.g., location in six degrees of movement) of the mobile device 102 relative to a proximate (near) Virtual Reality (VR) headset 308. The mobile device tracking module can be a case with passive elements, such as markings, an active case with electronic location elements or alternatively be built-in to the smartphone itself.

VR is a simulated experience that can be similar to the real world. Applications of virtual reality include entertainment (e.g. video games), education (e.g. medical or military training) and business (e.g. virtual meetings). Other distinct types of VR-style technology include augmented reality and mixed reality, sometimes referred to as extended reality or XR.

Currently, standard virtual reality systems use either virtual reality headsets or multi-projected environments to generate realistic images, sounds and other sensations that simulate a user's physical presence in a virtual environment. A person using virtual reality equipment is able to look around the virtual environment, move around in it, and interact with virtual features or items. The effect is commonly created by VR headsets consisting of a head-mounted display with a small screen in front of the eyes, but can also be created through specially designed rooms with multiple large screens. Virtual reality typically incorporates auditory and video feedback, but may also allow other types of sensory and force feedback through haptic technology.

When developing a new VR application, or updating an existing VR application, especially for large scale environments, travelling to a subject location to test the application as it is being developed may not be convenient or possible. Therefore, in various embodiments described herein, a virtual mobile device visualization within a VR simulation 706 combines physical and simulated inputs from the physical mobile device, such as, but not limited to, camera, microphone, sensor, display, and audio data (e.g., mobile device actions performed during testing). A remote app runs on a physical mobile device 102 collecting the physical inputs and communicates this data to a mobile app simulation 702 running on a mobile app development PC. This mobile app simulation may allow a mobile app under development to run on a standalone computer without repeated compiling and loading of the mobile app to the physical mobile device each time a change is made to the mobile app. In this way, the developer can continuously update or upgrade the code of the mobile app and test using the mobile device, but without requiring execution on the mobile device. The mobile simulation can also communicate data and configuration information to both the physical mobile device as well as the VR simulation.

Figure 8:
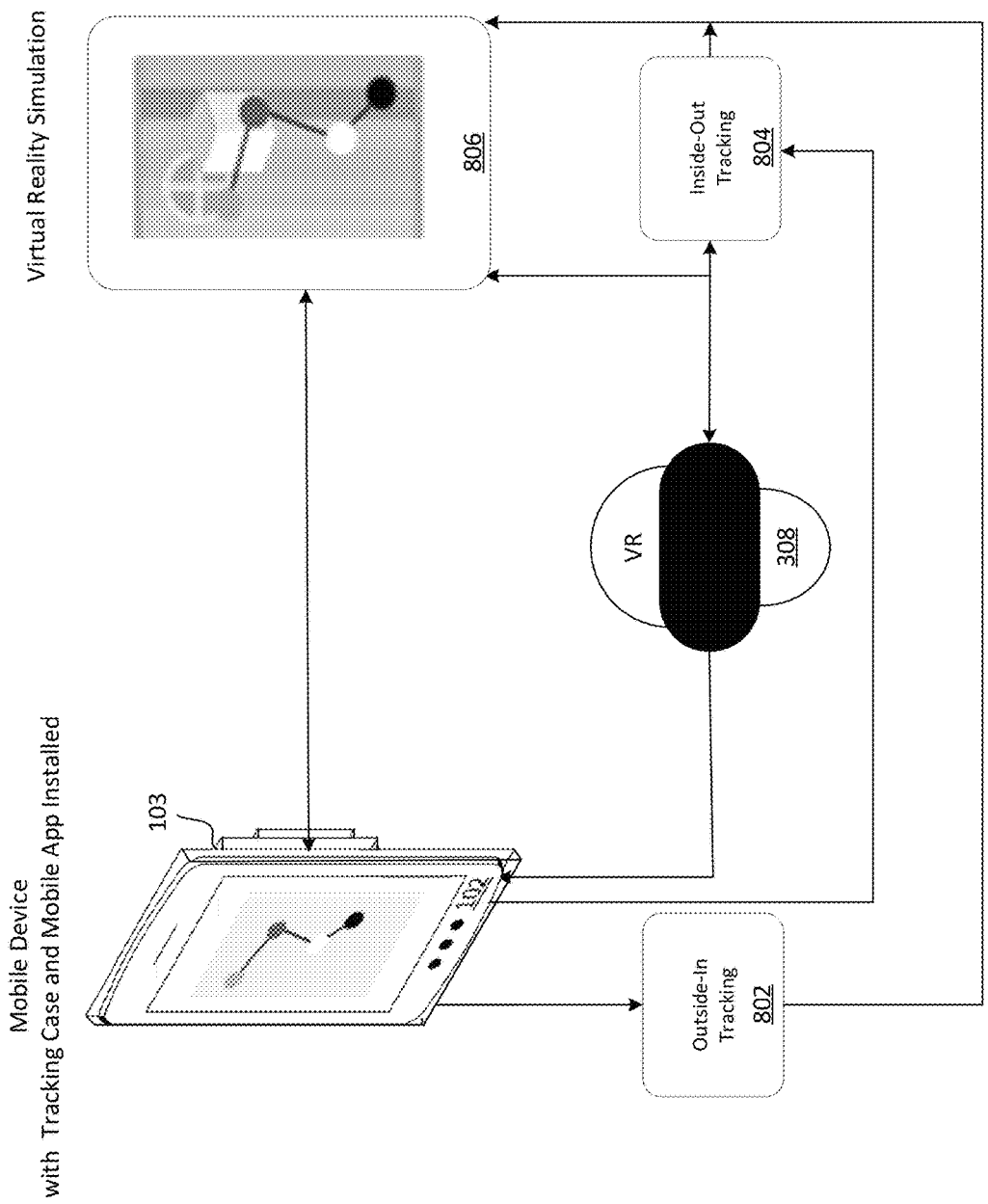
FIG. 8 illustrates a system for tracking a mobile device for a virtual mobile device visualization within a virtual reality (VR) simulation, according to some embodiments.

FIG. 8 illustrates a system 800 for tracking a mobile device for a virtual mobile device visualization within a virtual reality (VR) simulation 806, according to some embodiments. Physical mobile device 102 may include a downloaded mobile app. A VR PC or Standalone VR device (e.g., VR headset 308) provides a VR simulation 806 of a real-world location/environment to test the mobile application.

As previously described in FIGS. 1-4, a mobile device tracking module 103 attaches to a physical mobile device 102 in the real world to allow for precise inside-out or outside-in tracking of its physical location coordinates and screen boundary coordinates relative to a virtual origin within a VR simulation, transmitting and combining simulated and physical input, camera, microphone, sensor, display, and audio data between a VR simulation and a mobile app running on a physical mobile device.

A VR simulation 806 virtually recreates the context and physical real-world environments/LBE venues/outdoor or indoor installations, where the mobile app can be used, includes a virtual mobile device visualization within the VR simulation which combines the physical and simulated input, camera, microphone, sensor, display, and audio data from the VR simulation, the mobile app running on a physical mobile device.

In various embodiments, Outside-In tracking 802 (FIG. 4) and Inside-Out tracking 804 (FIG. 3) methods are configured to track a physical mobile device 102 screen bounding rectangle for captured video within VR headset 308.

Figure 9:
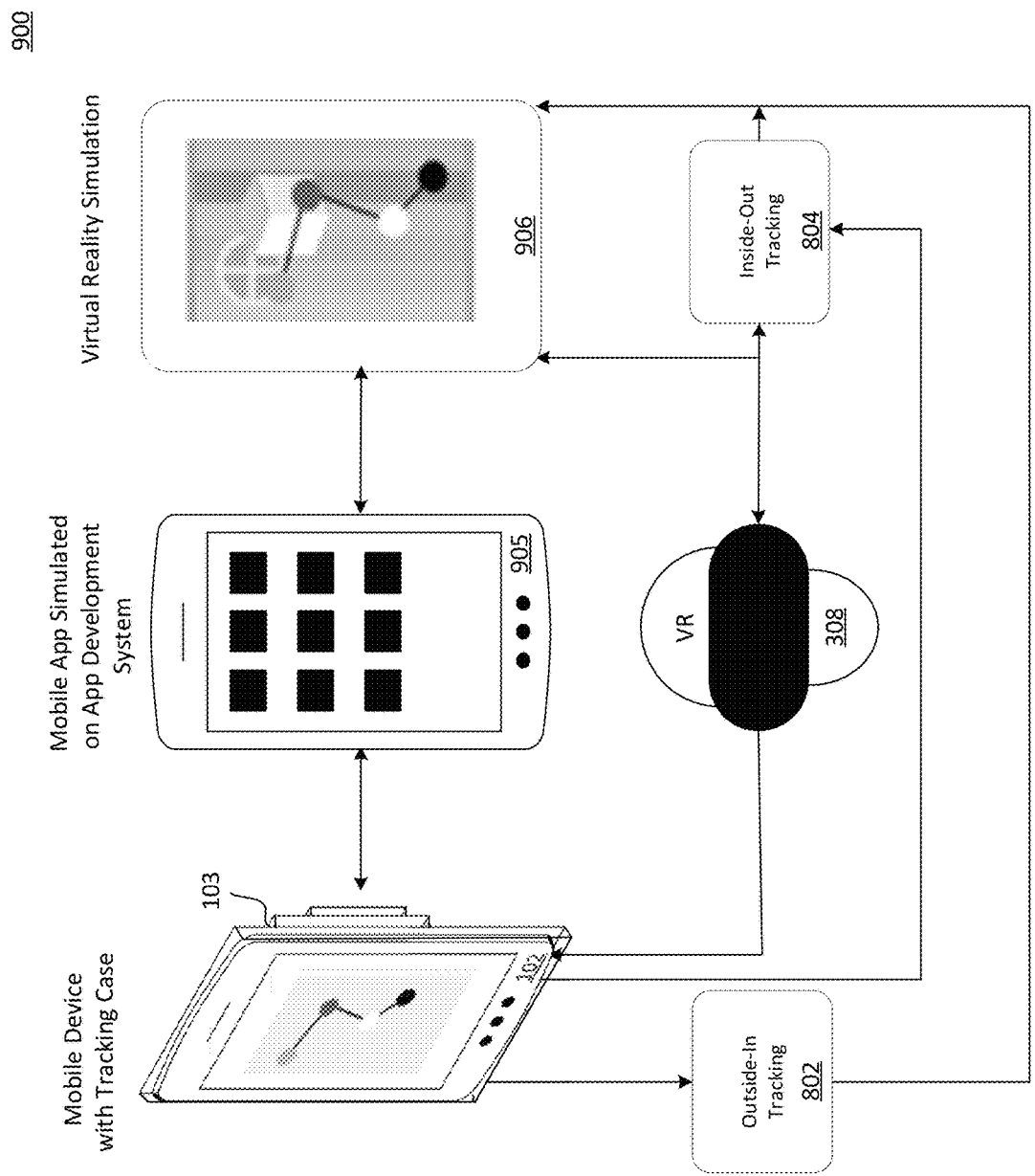
FIG. 9 illustrates a system for tracking a mobile device for a virtual mobile device visualization within a virtual reality (VR) simulation, according to some embodiments.

FIG. 9 illustrates a system workflow 900 for a virtual mobile device visualization within a virtual reality (VR) simulation, according to some embodiments. Physical mobile device 102 may include a downloaded app to capture input/outputs of the mobile device during testing. A VR PC or standalone VR device (e.g., VR headset 308) generates a VR simulation 806 of a real-world location/environment to test the mobile application.

A mobile app development PC or equivalent may implement a mobile app simulation 905. This mobile app simulation can be executed as a standalone software (e.g. compiled build) or a simulation generated from within game engine being developed with. A VR PC or standalone VR device generates a VR simulation 906 to test the mobile application.

In various embodiments, trackers using, for example, Outside-In tracking 802 (FIG. 4) and Inside-Out tracking 804 (FIG. 3) methods are configured to track a physical mobile device 102 screen bounding rectangle (perimeter of display) for captured video within VR headset 108. To visualize the physical mobile device as an overlay on the virtual environment, the mobile device's location and orientation relative to the VR headset is tracked. In some embodiments, the display screen perimeter (bounding rectangle) can be tracked to render a cropped VR headset captured video.

Figure 10:
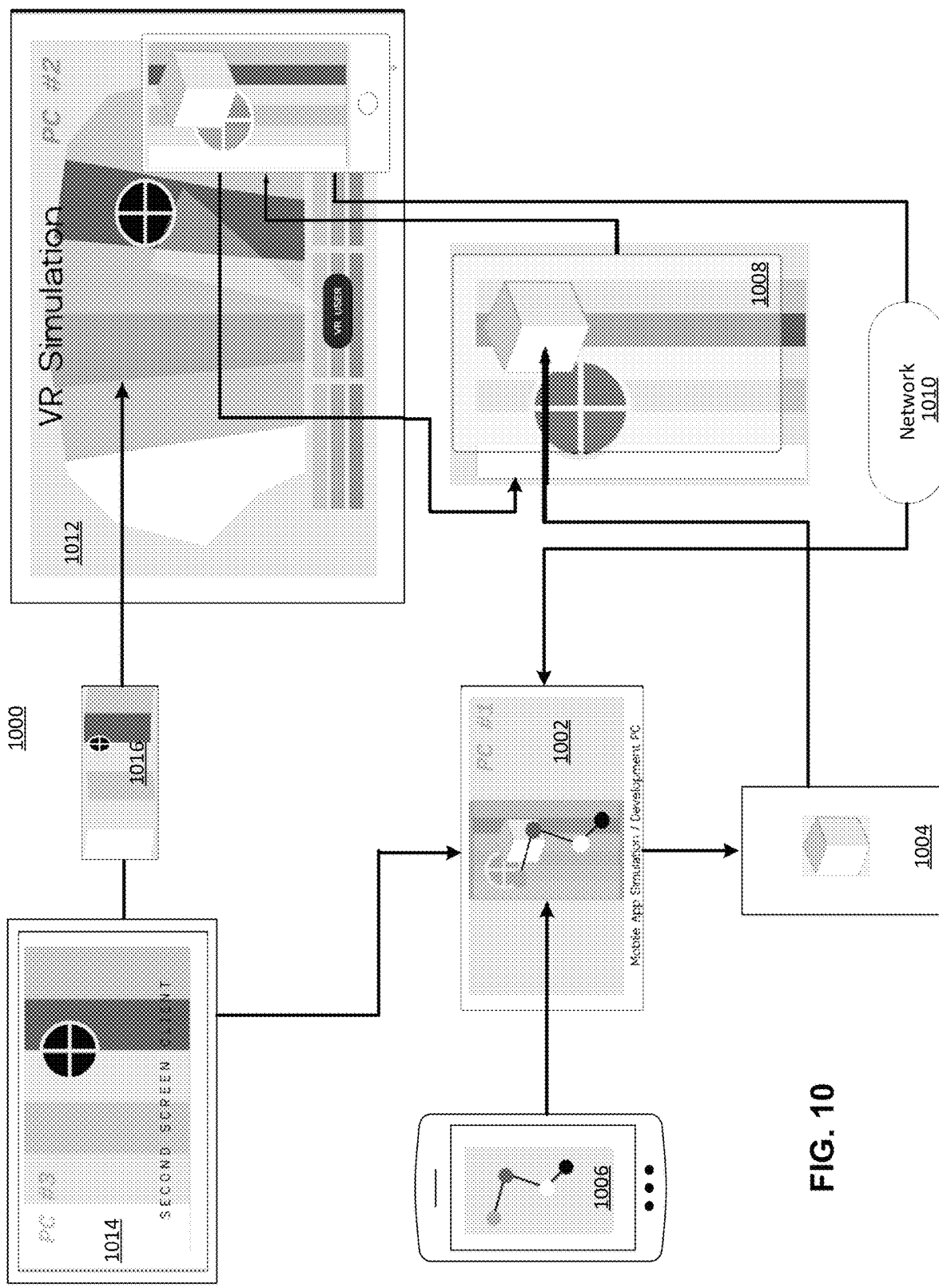
FIG. 10 illustrates a mobile app simulation rendering a cube as an alpha/AR overlay, according to some embodiments.

FIG. 10 illustrates an example embodiment 1000 implementing a mobile app simulation rendering a cube 1004 as an alpha/AR overlay 1008 that gets combined with a virtual mobile device camera capture 1006. The virtual mobile device camera is capturing a virtual scene from a position of the virtual mobile device, and the VR or mobile app combine the alpha/AR overlay with the capture of the virtual scene. In operation, the VR simulation sends the position and orientation of the virtual mobile device to the mobile app simulation 1002 so that the mobile app knows where it is relative to the virtual environment 1012. With this information, the system may properly render the viewpoint of the cube 1004 in the example for the alpha/AR overlay. This also illustrates a VR simulation with optional second screen video sources 1014 streaming 1016 into the VR environment 1012.

Network 1010 may include one or more wired and/or wireless networks. For example, the network 1010 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The representative functions described herein may be implemented in hardware, software, or some combination thereof. For instance, the representative functions may be implemented using computer processors, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Figure 11:
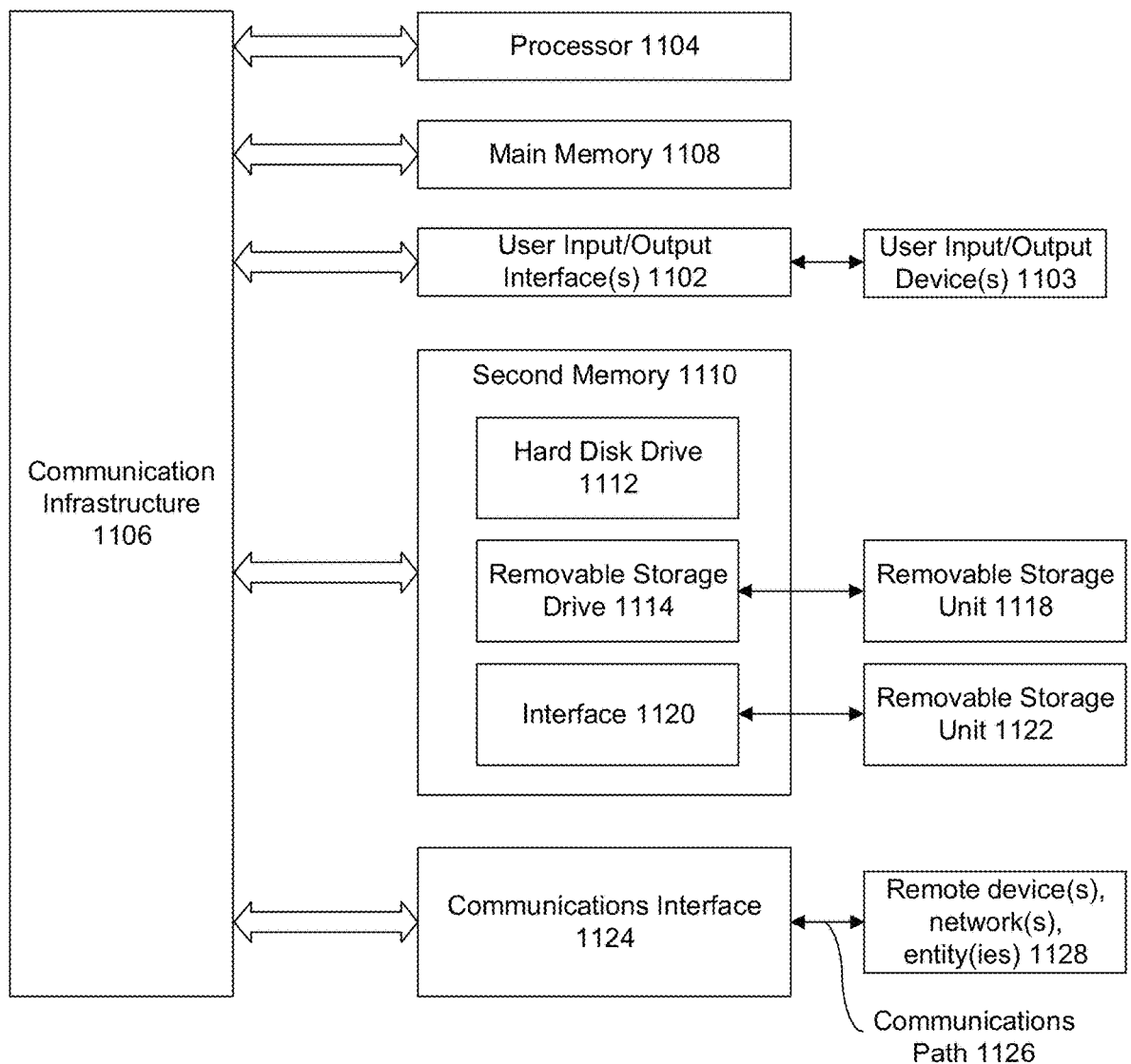
FIG. 11 illustrates an example computer system, according to some embodiments.

The following describes a general-purpose computer system that may be used to implement embodiments of the disclosure presented herein. The present disclosure may be implemented in hardware, or as a combination of software and hardware. Consequently, the disclosure may be implemented in the environment of a computer system or other processing system. An example of such a computer system 1100 is shown in FIG. 11.

Computer system 1100 includes one or more processors (also called central processing units, or CPUs), such as processor 1104. Processor 1104 may be a special purpose or a general purpose digital signal processor. Processor 1104 is connected to a communication infrastructure 1106 (for example, a bus or network). Various software implementations are described in terms of this exemplary computer system. After reading this description, it will become apparent to a person skilled in the relevant art how to implement the disclosure using other computer systems and/or computer architectures.

Computer system 1100 also includes user input/output device(s) 1103, such as monitors, keyboards, pointing devices, etc., that communicate with communication infrastructure 1106 through user input/output interface(s) 1102.

Computer system 1100 also includes a main memory 1105, preferably random access memory (RAM), and may also include a secondary memory 1110. The secondary memory 1110 may include, for example, a hard disk drive 1112, and/or a RAID array 1116, and/or a removable storage drive 1114, representing a floppy disk drive, a magnetic tape drive, an optical disk drive, etc. The removable storage drive 1114 reads from and/or writes to a removable storage unit 1118 in a well-known manner. Removable storage unit 1118 represents a floppy disk, magnetic tape, optical disk, etc. As will be appreciated, the removable storage unit 1118 includes a computer usable storage medium having stored therein computer software and/or data.

In alternative implementations, secondary memory 1110 may include other similar means for allowing computer programs or other instructions to be loaded into computer system 1100. Such means may include, for example, a removable storage unit 1122 and an interface 1120. Examples of such means may include a program cartridge and cartridge interface (such as that found in video game devices), a removable memory chip (such as an EPROM, or PROM) and associated socket, and other removable storage units 1122 and interfaces 1120 which allow software (i.e. instructions) and data to be transferred from the removable storage unit 1122 to computer system 1100.

Computer system 1100 may also include a communications interface 1124. Communication interface 1124 enables computer system 1100 to communicate and interact with any combination of remote devices, remote networks, remote entities, etc. (individually and collectively referenced by reference number 1128). Examples of communications interface 1124 may include a modem, a network interface (such as an Ethernet card), a communications port, a PCMCIA slot and card, etc., that are coupled to a communications path 1126. The communications path 1126 may be implemented using wire or cable, fiber optics, a phone line, a cellular phone link, an RF link and other communications links or channels.

The terms "computer program medium" and "computer usable medium" are used herein to generally refer to media such as removable storage drive 1114, a hard disk installed in hard disk drive 1112, or other hardware type memory. These computer program products are means for providing or storing software (e.g. instructions) to computer system 1100.

Computer programs (also called computer control logic) are stored in main memory 1105 and/or secondary memory 1110. Computer programs may also be received via communications interface 1124. Such computer programs, when executed, enable the computer system 1100 to implement the present disclosure as discussed herein. In particular, the computer programs, when executed, enable the processor 1104 to implement the processes and/or functions of the present disclosure. For example, when executed, the computer programs enable processor 1104 to implement part of or all of the steps described above with reference to the flowcharts herein. Where the disclosure is implemented using software, the software may be stored in a computer program product and loaded into computer system 1100 using raid array 1116, removable storage drive 1114, hard drive 1112 or communications interface 1124.

In other embodiments, features of the disclosure are implemented primarily in hardware using, for example, hardware components such as Application Specific Integrated Circuits (ASICs) and programmable or static gate arrays or other state machine logic. Implementation of a hardware state machine so as to perform the functions described herein will also be apparent to persons skilled in the relevant art(s).

The aforementioned description of the specific embodiments will so fully reveal the general nature of the disclosure that others may, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any hardware mechanism for storing information in a form readable by a machine (e.g., a computing device). For example, a machine-readable medium may include read only memory (ROM); random access memory (RAM); magnetic disk storage media; optical storage media; flash memory devices; and other hardware implementations. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

In embodiments having one or more components that include one or more processors, one or more of the processors may include (and/or be configured to access) one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

It is to be appreciated that the Detailed Description section, and not the Abstract section, is intended to be used to interpret the claims. The Abstract section may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for mobile application (app) development, the method comprising:
   determining, by a mobile app development system, a position and orientation of a mobile device tracking module attached to a mobile device;
   calculating, by the mobile app development system, a position and orientation of the mobile device relative to a proximate virtual reality (VR) device based on the position and orientation of the mobile device tracking module;
   simulating, by the mobile app development system, a real world environment to generate a simulated environment;
   generating, by the mobile app development system, a virtual visualization of the mobile device, the virtual visualization combining physical inputs and simulated inputs; and
   rendering, by the mobile app development system, the virtual visualization of the mobile device within the simulated environment based on the position and orientation of the mobile device;
   wherein the position and orientation of the mobile device provides a virtual position and orientation of the mobile device relative to a virtual origin within the rendering, and wherein the calculating further comprises determining a position and orientation of a display screen of the mobile device based on predetermined dimensional information of the mobile device.

2. The method of claim 1, wherein the determining comprises receiving, from one or more cameras, the position and orientation of the mobile device tracking module.

3. The method of claim 2, further comprising the one or more cameras detecting identifiable markings around a perimeter of the mobile device tracking module.

4. The method of claim 1, wherein the determining comprises receiving, from one or more cameras of the VR device, the position and orientation of the mobile device tracking module.

5. The method of claim 1, wherein the determining the position and orientation of the mobile device tracking module includes receiving position and orientation information from active tracking elements within the mobile device tracking module, the active tracking elements comprising any of: a Global Positioning System (GPS), a gyroscope, an accelerometer, a magnetometer, inclinometer, sensors, or a light system.

6. The method of claim 1, wherein the determining comprises receiving, from one or more cameras, the position and orientation of the mobile device tracking module and the position and orientation of the VR device.

7. The method of claim 1, further comprising determining location coordinates of a perimeter of the mobile device.

8. The method of claim 1, further comprising determining location coordinates of a boundary of the display screen of the mobile device.

9. The method of claim 1, further comprising communicating, by the mobile app development system, the rendering to the VR device.

10. The method of claim 1, further comprising displaying the rendering within the VR device.

11. A system for tracking a mobile device, the system comprising:
a virtual reality (VR) device configured to:
receive position and orientation information of a mobile device tracking module attached to the mobile device;
determine, based on the position and orientation information of the mobile device tracking module, a position and orientation of the mobile device relative to the VR device;
simulate a real world environment to generate a simulated environment;
generate a virtual visualization of the mobile device, the virtual visualization combining physical inputs and simulated inputs; and
render the virtual visualization of the mobile device within the virtual simulated environment based on the position and orientation of the mobile device;
wherein the position and orientation of the mobile device provides a virtual position and orientation of the mobile device relative to a virtual origin within the rendering, and wherein the determining further comprises determining a position and orientation of a display screen of the mobile device based on predetermined dimensional information of the mobile device.

12. The system of claim 11, wherein the VR device is further configured with one or more cameras and the position and orientation information of the mobile device tracking module is received from the one or more cameras.

13. The system of claim 12, wherein the one or more cameras are configured to track the position and orientation of the tracking module based on machine vision techniques.

14. The system of claim 11, wherein the position and orientation information of the mobile device tracking module is received from a stand-alone camera configured to track the position and orientation of the mobile device tracking module and send the position and orientation of the mobile device tracking module to the VR device.

15. The system of claim 11, wherein the mobile device tracking module comprises active tracking elements including any of: a Global Positioning System (GPS), a gyroscope, an accelerometer, a magnetometer, inclinometer, sensors, or a light system.

16. The system of claim 11, wherein the mobile device tracking module comprises passive tracking elements of identifiable markings around a perimeter of the mobile device tracking module.

17. The system of claim 11, wherein the mobile device tracking module comprises any of: an active sensor, a computer processor, communication circuitry, an interface, a position sensor, an orientation sensor, or a power source.

18. The system of claim 11, wherein the mobile device comprises: a smartphone, a tablet, or a wearable computer.

19. A non-transitory computer-readable device having instructions stored thereon that, when executed by at least one computing device, cause the at least one computing device to perform operations comprising:
determining a position and orientation of a mobile device tracking module attached to a mobile device;
calculating a position and orientation of the mobile device relative to a proximate virtual reality (VR) device based on the position and orientation of the mobile device tracking module;
simulating a real world environment to generate a simulated environment;
generating a virtual visualization of the mobile device, the virtual visualization combining physical inputs and simulated inputs; and
rendering the virtual visualization of the mobile device within the simulated environment based on the position and orientation of the mobile device;
wherein the position and orientation of the mobile device provides a virtual position and orientation of the mobile device relative to a virtual origin within the rendering, and wherein the calculating further comprises determining a position and orientation of a display screen of the mobile device based on predetermined dimensional information of the mobile device.

* * * * *